(12) United States Patent
Sekhar

(10) Patent No.: US 7,067,775 B2
(45) Date of Patent: Jun. 27, 2006

(54) TREATMENT FOR IMPROVING THE STABILITY OF SILICON CARBIDE HEATING ELEMENTS

(75) Inventor: Jainagesh Sekhar, Cincinnati, OH (US)

(73) Assignee: Micropyretics Heaters International, Inc., Cincinnati, OH (US)

(*) Notice: Subject to any disclaimer, the term of this patent is extended or adjusted under 35 U.S.C. 154(b) by 0 days.

(21) Appl. No.: 10/369,700

(22) Filed: Feb. 21, 2003

(65) Prior Publication Data

US 2003/0183621 A1 Oct. 2, 2003

Related U.S. Application Data

(60) Provisional application No. 60/365,539, filed on Mar. 20, 2002.

(51) Int. Cl.
*H05B 3/12* (2006.01)

(52) U.S. Cl. ........................ 219/548; 252/516

(58) Field of Classification Search ............... 219/552, 219/553, 548, 543; 252/516; 427/58; 501/92
See application file for complete search history.

(56) References Cited

U.S. PATENT DOCUMENTS

| | | | |
|---|---|---|---|
| 2,993,814 A * | 7/1961 | Epprecht et al. | 427/58 |
| 3,199,993 A * | 8/1965 | Schrewelius | 501/96.3 |
| 3,246,275 A * | 4/1966 | Schrewelius | 501/92 |
| 3,296,021 A * | 1/1967 | Schrewelius | 427/243 |
| 5,569,427 A * | 10/1996 | Semenova et al. | 264/129 |
| 5,585,313 A * | 12/1996 | Shobu et al. | 501/92 |
| 5,622,751 A * | 4/1997 | Thebault et al. | 427/376.2 |
| 5,626,923 A * | 5/1997 | Fitzgibbons et al. | 427/535 |
| 2001/0051218 A1* | 12/2001 | Wittenauer et al. | 427/376.2 |
| 2002/0027130 A1* | 3/2002 | Miyata | 219/543 |
| 2003/0106888 A1* | 6/2003 | Gnesin et al. | 219/553 |

* cited by examiner

*Primary Examiner*—Teresa J. Walberg

(57) ABSTRACT

A treatment and an object so treated, which may be used to improve the electrical stability, energy efficiency and performance of silicon carbide heating elements is disclosed. Use is made of colloidal binders and silicides to treat silicon carbide heating elements in a manner which improves their electrical stability during use. The resultant heating element may be used to conserve energy, during its life cycle because of the use of lower power.

10 Claims, 1 Drawing Sheet

Comparison of a Treated SiC element to a standard SiC element in an accelarated test for demonstrating the stability of the treated element.

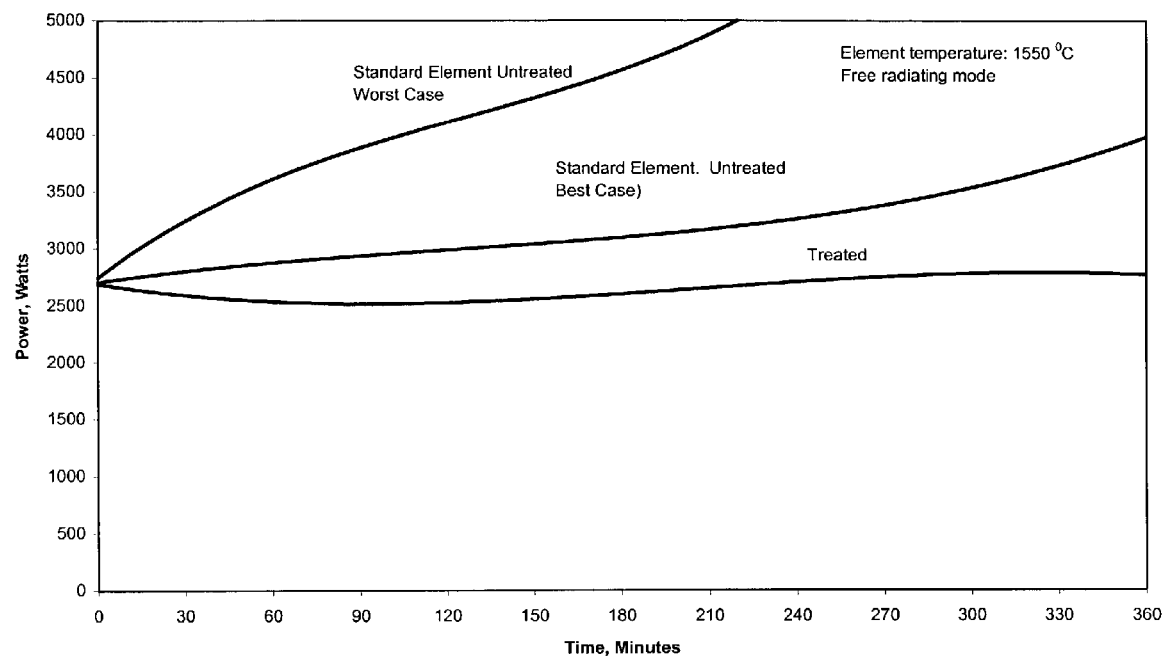
Figure 1 Comparison of a Treated SiC element to a standard SiC element in an accelarated test for demonstrating the stability of the treated element.

TREATMENT FOR IMPROVING THE STABILITY OF SILICON CARBIDE HEATING ELEMENTS

This application claims the benefit of U.S. patent application Ser. No. 60/365,539, filed Mar. 20, 2002.

BACKGROUND

There are several types of elements materials commonly used for electrical heating (see Table 1). In addition to those which are discussed below, heating elements made of graphite, aluminum and boron nitride are also sometimes used as electric heaters. Even less common are Lanthanum Chromite heating elements.

Metallic Elements (2 major types)

The two types of metallic elements are nickel/chrome (NiCr) and iron-chromium-aluminum (Fe—Cr—Al). The metallic elements are the least expensive, however, they have the lowest use temperatures. Ni—Cr is limited to use at 1100° C. whereas the iron-chromium aluminum alloys (sometimes referred to in the industry as Kanthal A-1) can be used to 1300° C. Nichrome, although limited to the lower temperatures, has very good hot strength so the elements can be self-supporting whereas the Fe—Cr—Al elements with poorer hot strength must be supported usually by ceramic tubes.

Nichrome elements are 80% nickel and 20% chrome which is the most common composition. Both types of metallic elements have the advantage that their electrical resistance stays constant with time so that as the elements age it is not necessary to make compensations for changing resistance. Also, the metallic elements have more or less constant resistance at all temperatures. As a result of the fact that the resistances are constant, inexpensive on/off controls can be used with metallic elements.

The Nichrome element forms a chromiumoxide layer when heated in the presence of air. The oxide layer is relatively thick, greenish in color and has a propensity to flake off during cycling. This flaking exposes the base material to further oxidation, which eventually leads to the element failure. This flaking can also lead to product contamination but the element should be located in such a position that the oxide will not land on the product.

Other metallic heating elements which are used but may not be used in air are made of pure molybdenum and pure tungsten. These have the drawback that they easily oxidize in air as low at 300 C. and so must be used in vacuum or some special types of inert/reducing atmospheres.

It is well known that metallic heating elements are not particularly useful primarily because of limited life above 1100° C. if used in air. Thus ceramic and intermetallic elements are used for higher temperatures. These are described below.

Silicon Carbide Elements

Silicon carbide elements are the least expensive heating elements for the temperature ranges between 1300 and 1500° C. Silicon carbide elements cost about half as much as the higher temperature elements discussed below and they also have the advantage that they can be mounted horizontally and are self-supporting. Silicon carbide elements are generally made in rod form and have a hot center zone and two cold ends or have a spiral cut. The cold ends are impregnated with silicon metal so that they offer very low resistance and minimize power losses. Silicon carbide elements can take a much higher watt loading per square centimeter than metallic elements and, therefore, fewer elements are required to obtain the same heat input. Primarily this occurs because they have a better high temperature capability than metallic heating elements.

Silicon carbide elements are manufactured from grains of silicon carbide, which are bonded together in a sintering process. Sintering causes bridges between the grains, which provides a means for current flow through the element. Over a period of time, the SiC bridges between the grains will slowly oxidize to silica ($SiO_2$) which is a poor conductor of electricity. As a result, the resistance of the element increases with time and this process is called aging. One of the drawbacks of aging is that the power required to heat the element to the same temperature increases. Over the lifetime of the silicon carbide elements, the resistance will generally increase by a factor of 4. Silicon carbide also exhibits a changing resistance with temperature. The resistance is fairly high a room temperature but falls to a minimum value at about 800° C. At element temperatures above 800° C., resistivity increases with rising temperatures. Due to the characteristics of aging and resistance change, silicon carbide elements cannot use inexpensive on/off controls but must use silicon-controlled rectifiers (SCR control). SCR control is more expensive then on/off control but can handle the increased voltage as the elements age and also can limit the current during the negative portion of the resistance curve. Silicon carbide elements are available in the alpha and beta varieties of Silicon Carbide.

Normally when silicon carbide heating elements are used in a furnace, the transformer in the circuit has to be rated for a much higher power than required because of the aging. Over the life the transformer tappings have to be changed. There is a need to improve the silicon carbide elements such that aging is reduced and power stability and longevity of performance are enhanced.

Molybdenum diSilicide Elements

These elements can reach temperatures of 1900° C. (U.S. Pat. No. 6,099,978) and are preferred over the lower cost silicon carbide elements as that resist aging. However, such elements are prone to pesting (a low temperature oxidation phenomena). Nevertheless, like all ceramic and intermetallic elements, such elements are brittle. SCR control and current limiting electronics are required for operation.

Zirconia Elements

Zirconia elements are the only elements that can be used in an air atmosphere at temperatures higher than molybdenum disilicide elements. Zirconia elements have only been used in laboratory size kilns because they are only available in small sizes and are very expensive. Also, these elements must be preheated to 1000° C. before conduction even starts. Zirconia elements can be used at kiln temperatures up to 2000° C. and SCR controls are required. Such Zirconia elements are the most clumsy elements to use and are often noted to have short life.

TABLE 1

TYPES OF ELECTRIC ELEMENTS
(For Use in Air)

|  | Nickel-Chrome NiCR | Iron-Chrome-Aluminum Fe-CR-AL | Silicon Carbide SiC | Molybdenum Disilicide $MoSi_2$ | Zirconia $ZrO_2$ |
|---|---|---|---|---|---|
| Max. Element Temp. (Air) | 1200° C. | 1400° C. | 1650° C. | 1900° C. | 2200° C. |
| Max. Use Temp. (Air) | 1100° C. | 1300° C. | 1550° C. | 1800° C. | 2000° C. |
| Max. Use Temp. ($N_2$) | 1120° C. | 1100° C. | 1350° C. | 1650° C. |  |
| Element Material Class | Metallic | Metallic | Ceramic | Ceramic | Ceramic |
| Electrical Resistance |  |  |  |  |  |
| vs. Time (Aging) | Constant | Constant | Increases 4 times | Constant | Constant |
| vs. Temperature | Constant | Constant | Decreases to 800° C. then slowly increases | Increases 10–14 times | Conduction starts at 1000° C. |
| Type Control Required | On/Off | On/Off | SCR | SCR | SCR |
| Major Limitation | Limited to 1100° C. | Poor hot strength Needs element support | Elements age (unstable), Brittle Requires costly transformers | Not many Brittle | Must be preheated to 1000° C. Very brittle. |

Table 1 shows a chart entitled "Types of Electric Elements".

INVENTION

We have invented a treatment where the stability and other performance measures such as emissivity of the silicon carbide is greatly enhanced. Stability is defined as the lack of change or very little change in the electrical properties and power draw with time during use at a high temperature. To the best of our knowledge there is no previous claim to a treatment which claims improved stability and performance in a silicon carbide containing heating element. Both alpha and beta Silicon carbide elements may be improved in performance by the proposed technique and examples of use are given below.

The treatment consists of applying an adherent mixture of silica (a binder) and compounds of molybdenum silicon i.e. molybdenum suicides (in powder or short fiber form, both forms herein called powder) to a SiC heating element prior to use in a furnace. Since all Silicon Carbide heating elements are porous, the mixture is normally well absorbed by the heating element. One or more layers can be applied by brushing or spraying or dipping in an aqueous mixture of Silica and molybdenum silicon compounds. The silica can be in any suitable form, which causes adherence of the treatment materials (all forms of crystalline and/or amorphous oxides of silicon are expected to be encompassed by the word silica). The silica may be a gel or colloid or in the form of powder which is mixed into the Molybdenum silicon compound. Both the binder material and the molybdenum silicon material could be either powder ranging from nanometer size particles to millimeter size particles or finely dispersed in a fluid such as water or common organic solvents such as kerosene or alcohol. The silica could also be obtained by using clay as the binder (Clay is an aluminosilicate). When the word silica powder is used in this application and claims it encompasses colloidal dispersed silica or gel or silica compounds in the various dispersed forms possible or by themselves. When coating of the a silicon carbide element is mentioned it is assumed that this coating is possible for new as well as partially used silicon carbide elements.

Although molybdenum disilicide, is considered in the experiment given below, for the molybdenum silicide compound of choice, we recognize that all forms of molybdenum silicides or tungsten silicides or other common silicides are encompassed even if claimed separately). The words molybdenum disilicide, MoSi2 or molybdenum silicide are expected to cover all such variations.

After the treatment, the entire heating element may be heated, prior to use, in order to either dry or layer the heating element. However, normally this step is not required and the heating step can be concomitant with the heating, i.e. where the silicon carbide is employed, in the furnace where it serves as a heating element (i.e. during the furnace use itself).

In one embodiment of the invention, molybdenum disilicide powder was mixed with silica which was obtained in aqueous dispersed form and applied to a standard silicon carbide heating element material cut from a commercial heating element rod. After the application of three layers by brush, the sample was dried overnight, and tested for stability. The test consisted of measuring and continuously providing the power required (demanded by the heating element) to hold the samples at 1550 C. AC current was used for the test along with an optical pyrometer for temperature measurement, a transformer and other SCR (silicon controlled rectifier) type control electronics. Untreated samples were also tested for comparison. All tests were conducted with the same experimental set-up and the conditions were maintained so that a proper comparison could be made. It was noted, that a wide scatter in the stability was seen for the untreated silicon carbide, i.e. all untreated samples invariably showed instability with time, and the power demand kept increasing to maintain the same set temperature. In contrast, the treated sample was found to be exceedingly stable (see curve in FIG. 1 below and note the line for treated samples). The temperature of the test was kept high in order to accelerate the possible degradation with time in a reasonable time frame of the test. It is anticipated that the life enhancement and improved performance will be noted for all temperatures of use of the heating element.

ment. The increase in emissivity is thought to be on account of the presence of molybdenum and/or tungsten in the application mixture.

As a final point, we have found that the application of the mixture does not change the physical dimensions of the silicon carbide heating element in any substantial sense as the mixture is mostly absorbed in the existing pores. We have also not found any change in the electrical characteristics as the amount of mixture is typically very small (application of one or two small thin layers, i.e. less than 100 microns in any brush stroke).

TABLE 2

ACCELARATED TEST FOR SPIRAL CUT ELEMENT: Treated SiC element compared to similar size and resistivity standard industrial heating element.. Measured with an emissivity value on pyrometer set to 0.9.

| Temperature Of Accelerated Test. | Average Power Consumption by treated Element to maintain set temperature (Watts) | Average Power Consumption for Standard (untreated) Element to maintain set temperature (Watts) | Standard Deviation for treated SiC Element power variation for fixed point temperature test (Watts) | Standard Deviation for Standard Untreated Sic Element power variation for fixed point temperature test (Watts) | Life Enhancement In Accelerated Test Condition (% increase in life of treated SiC Spiral cut over a standard element). |
|---|---|---|---|---|---|
| 1500° C. | 1891.8 | 2015.4 | 67.2 | 90.97 | — |
| 1625° C. | 2432.8 | 2883.1 | 32.4 | 87.69 | 120% |
| 1650° C. | 2759.0 | 4522.0 | 349.9 | Highly Unstable | 1250% The standard element did not last and that is why the life enhancement is unduly large at these temperatures |

Test Conditions: Open Air. No enclosure.
Beta Silicon Carbide test results on a spiral cut element. Size of element compared OL = 17.5",
HZ = 6", CZ = 5.75" and OD = 0.56

In the best embodiment to date, a ratio by weight of one part of Molybdenum disilicide to nine parts of silica were used for the mixture of the treatment. FIG. 1, shows the results of the accelerated stability tests (Test Conditions: open Air, no enclosure, and test temperature of 1550 C. measured at a high emissivity) for the alpha silicon carbide heating element material with and without the treatment. Note that the treatment dramatically improves stability (nearly flat line with power for the treated heating element). In this manner, we anticipate that over the life of the element, the energy efficiency and life are expected to be improved when the heating element has received the treatment described in this application. As silicon carbide containing elements are very commonly employed by the materials manufacturing industry, the saving of energy is expected to be substantial. Table 2 below shows the benefit for the for Beta Silicon carbide spiral cut heating element with the same treatment mixture described above as the best embodiment. The results indicate that the treated spiral cut elements display; (1) savings in the energy demand to maintain equivalent temperature and thus better power stability (6–18%) and (2) significant life enhancement. In the claims below the improvements in performance of the SiC element refers to the above two points and to the increase in emissivity of the heating element on account of the treat-

I claim:

1. An absorbing treatment to silicon carbide containing heating element by which the stability and/or performance of the heating element is enhanced by the application of a mixture of a suicide powder and a colloidal binder to the heating element surface.

2. The treatment of claim 1 comprising of a mixture of tungsten silicide powder and colloidal silica.

3. The treatment of claim 1 comprising of the application of a mixture of molybdenum silicide powder and colloidal silica.

4. The treatment of claim 1 wherein the mixture is in an aqueous dispersed state.

5. The treatment of claim 1 wherein the binder is silica in a colloidal state.

6. The treatment of claim 1 consisting of the application of a mixture of molybdenum disilicide powder and colloidal silica compounds in a weight ratio of about 1:9 respectively.

7. The product of claim 1.

8. The product of claim 2.

9. The product of claim 3.

10. The treatment of claim 1, wherein the colloidal binder ranges from about 4% to 50% by weight of the mixture.

* * * * *

UNITED STATES PATENT AND TRADEMARK OFFICE
CERTIFICATE OF CORRECTION

| | | |
|---|---|---|
| PATENT NO. | : 7,067,775 B2 | Page 1 of 1 |
| APPLICATION NO. | : 10/369700 | |
| DATED | : June 27, 2006 | |
| INVENTOR(S) | : Jainagesh Sekhar | |

It is certified that error appears in the above-identified patent and that said Letters Patent is hereby corrected as shown below:

Column 3, line 48, the word "suicides" is replaced with the word "silicides".

Column 6, line 44, the word "suicide" is replaced with the word "silicide".

Signed and Sealed this

Third Day of January, 2012

David J. Kappos
*Director of the United States Patent and Trademark Office*